United States Patent [19]

Bürger et al.

[11] Patent Number: 5,403,524
[45] Date of Patent: Apr. 4, 1995

[54] POROUS POLYTETRAFLUOROETHYLENE AND A PROCESS FOR THE PRODUCTION THEREOF

[76] Inventors: Wolfgang Bürger, Böcklerweg 30, D-81825, München; Richard Witzko, Geranienstr. 100, 85521, Riemerling, both of Germany

[21] Appl. No.: 214,939

[22] Filed: Mar. 16, 1994

[30] Foreign Application Priority Data

Mar. 16, 1993 [DE] Germany ............... 43 08 368.4

[51] Int. Cl.$^6$ ............... B27J 5/00; B29C 35/02
[52] U.S. Cl. ............... 264/22; 264/127; 264/235.8; 264/288.4; 264/288.8; 264/290.2; 521/79; 521/81; 521/134; 521/145
[58] Field of Search ............ 264/127, 22; 521/79, 521/81, 145, 134

[56] References Cited

U.S. PATENT DOCUMENTS

| | | |
|---|---|---|
| 3,953,566 | 4/1976 | Gore . |
| 3,962,153 | 6/1976 | Gore . |
| 4,187,390 | 2/1980 | Gore . |
| 4,650,815 | 3/1987 | Namba et al. ............ 264/127 |
| 5,064,593 | 11/1991 | Tamaru et al. . |
| 5,087,641 | 2/1992 | Sato . |
| 5,098,625 | 3/1992 | Huang et al. . |
| 5,102,921 | 4/1992 | Harada et al. ............ 264/127 |
| 5,110,527 | 5/1992 | Harada et al. ............ 264/127 |

FOREIGN PATENT DOCUMENTS

| | | |
|---|---|---|
| 0170382 | 6/1985 | European Pat. Off. . |
| 418155 | 3/1991 | European Pat. Off. . |
| 4117281 | 5/1991 | Germany . |
| 1078823 | 3/1989 | Japan . |

*Primary Examiner*—Morton Foelak
*Attorney, Agent, or Firm*—Dena Meyer Weker

[57] ABSTRACT

A new porous polytetrafluoroethylene (PTFE) and a process for the production thereof is provided. Both the PTFE and the process excel by the fact that polytetrafluoroethylene is radiation-chemically degraded, the degraded polytetrafluoroethylene is mixed with a high-molecular emulsion polymerisate of polytetrafluoroethylene and the mixture is extruded, stretched and may additionally be sintered.

6 Claims, 2 Drawing Sheets

POROUS POLYTETRAFLUOROETHYLENE AND A PROCESS FOR THE PRODUCTION THEREOF

FIELD OF THE INVENTION

The invention relates to a modified porous polytetrafluoroethylene and a process for its production.

BACKGROUND OF THE INVENTION

Microporous polytetrafluoroethylene and the production thereof was first described in U.S. Pat. Nos. 3,953,566 and 4,187,390. The material consists solely of high-molecular emulsion polymerisate of PTFE (hereinafter referred to as PTFE) which is paste-extruded and then expanded. U.S. Pat. No. 3,953,566 describes the production of an expanded microporous PTFE with a stable structure, in which coagulated dispersions are used as starting materials. These products have found a wide range of applications due to their chemical and physical stability.

The state of the art also includes modifications of PTFE having certain chemical and physical properties. U.S. Pat. No. 5,098,625, for instance, describes a process for the production of porous PTFE-membranes of increased density, improved flexibility and reduced cold flow which are also made from coagulated dispersions. This type of PTFE, however, has less tensile strength than the unmodified PTFE.

EP 418155 proposes to partially sinter high-molecular PTFE and expand it afterwards to improve thermal stability and dimensional stability and to increase porosity.

Furthermore U.S. Pat. No. 5,064,593 describes a multilayer PTFE-membrane which comprises a small-pored filter layer made from a non-fibril forming PTFE fine powder and an open-pored supporting layer made from high-molecular PTFE. Each layer must be produced separately and the separate layers are linked with each other during processing.

U.S. Pat. No. 5,102,921 describes a PTFE-material of high porosity with a large pore diameter, which is obtained by a mixture of a high-molecular and a low-molecular PTFE fine powder. These products, however, have a low mechanical strength.

In this connection, U.S. Pat. No. 5,087,641 suggests a process in which a microporous membrane is subsequently modified with a dispersion of a sintered or irradiated PTFE material. The additional component is incorporated into the pore interstices, which creates a certain reinforcing effect.

A modification of the properties of porous PTFE material by admixtures of low-molecular PTFE is desirable in particular with a view to the reutilization of polymerisate scrap.

Generally speaking high-molecular emulsion polymerisates of PTFE can form fibril structures during the paste extrusion and expansion steps. Low-molecular PTFE-types, however, cannot be expanded and thus will not form any fibril structures.

Experts know that irradiated PTFE generally have reduced mechanical strength.

There is a need for a material of porous polytetrafluoroethylene which can be produced by incorporating perfluorinated non-expandable polymers into high-molecular PTFE-material without compromising the desirable mechanical properties such as tear resistance, tensile strength and break elongation.

SUMMARY OF THE INVENTION

A porous polytetrafluoroethylene material comprising a mixture of degraded polytetrafluoroethylene and a high molecular weight polymerisate of polytetrafluoroethylene is provided wherein the mixture is further subjected to a process comprising extrusion and expansion steps. The porous polytetrafluoroethylene material may also be sintered. The degraded polytetrafluoroethylene may be degraded by a radiation degradation process by means of electron rays. The energy dose may range from 10 to 3000 kGy. The degraded polytetrafluoroethylene has a molecular weight of at most $10^6$. The emulsion polymerisate has an average molecular weight of between $2 \times 10^6$ and $50 \times 10^6$. The amount of degraded polytetrafluoroethylene relative to the total mass of the material is between 1 and 50%. The degraded polytetrafluoroethylene has a particle size from 0.1 to 100 micrometers.

A process for the production of porous polytetrafluoroethylene material is also provided comprising the steps of a) degrading polytetrafluoroethylene by radiation; b) mixing the degraded polytetrafluoroethylene with a high molecular emulsion polymerisate of polytetrafluoroethylene to form a mixture; c) extruding; and (d) expanding to form a porous material. The porous material may also be sintered.

DETAILED DESCRIPTION OF THE PREFERRED EMBODIMENTS

Figure 1:
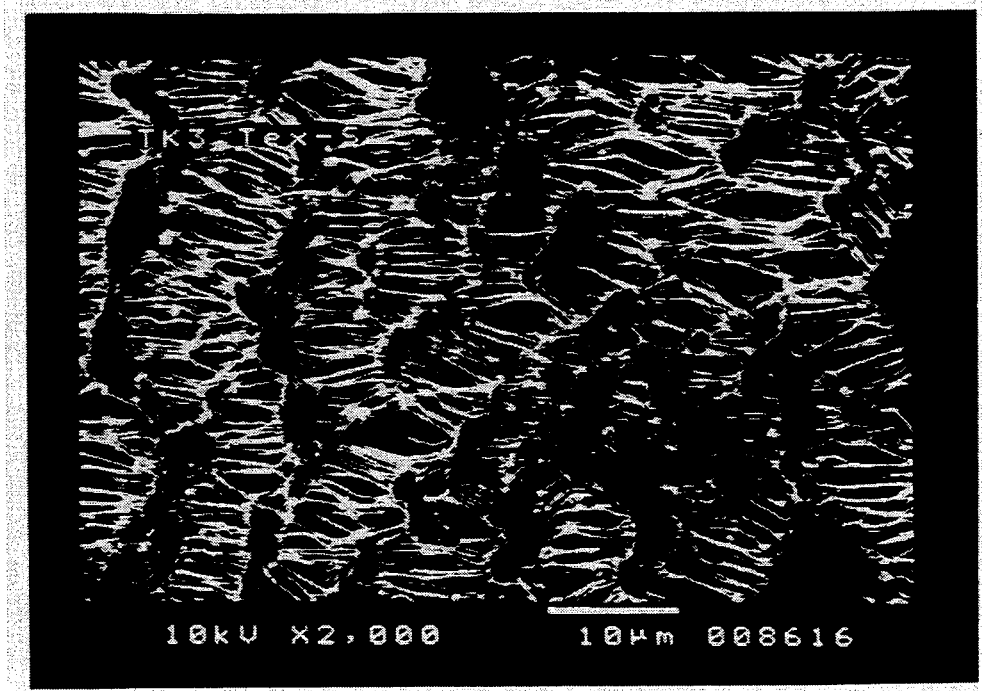
FIG. 1 is a photomicrograph of a cross-section of the membrane prepared in accordance with Example 4 at $2000 \times$ magnification.

A modified porous polytetrafluoroethylene is provided comprising a mixture of PTFE that has been degraded by exposure to radiation and a high-molecular emulsion polymerisate of PTFE. The mixture is then extruded, expanded and optionally sintered (heated above the crystalline melt point of PTFE). A method of making this modified polytetrafluoroethylene is also provided.

Surprisingly, this modified porous polytetrafluoroethylene has excellent tear elongation and tear resistance value. Tensile strength and tear resistance are higher than that of pure high-molecular microporous PTFE. This was not expected with the use of radiation degraded PTFE. Loading and coating experiments with the expanded compounds have shown that the modified polytetrafluoroethylene performs better than conventional microporous PTFE such as those made in accordance with the method described in U.S. Pat. No. 3,953,566.

Both unsintered and sintered PTFE powder as well as microporous PTFE (with no additives) which is PTFE that has been expanded and sintered (such as those products sold by W. L. Gore & Associates, Inc.) may be subjected to a radiation degradation process and further used in the inventive process. The emulsion polymerisate may be a homo- or copolymerisate of PTFE. The strength of the resulting mixed polymerisate is dependent on the average particle size of the radiation degraded PTFE, its chemical composition and starting crystallinity, all of which can be influenced by the type of radiation utilized. The porosity and the average pore size of the resulting membranes is dependent on the amount of radiation degraded component used, the content of lubricant, the mixing procedure and the extrusion pressure.

The term "high-molecular PTFE-emulsion polymerisate" denotes polymerisates of PTFE with an numerical average molecular weight $M_n$ of $2 \times 10^6$ to $50 \times 10^6$. In general, these types are used for the production of expanded porous membranes. The radiation degraded perfluorinated polymer usually has numerical average molecular weight $M_n$ of less than $10^6$. Such polymerisates are not expandable.

The radiation degradation is effected with energy rich radiation, preferably with the use of electron rays. The radiation can be effected in the presence of oxygen from the air or under an inert gas atmosphere (such as $N_2$). An emulsion or suspension polymerisate of PTFE or PTFE-scrap can be used. The degradation products are preferably subjected to tempering at a temperature above 150° C. in order to remove radicals, low-molecular fission products and hydrogen fluoride.

An energy dose ranging from 10 to 3000 kGy has turned out to be particularly suitable to obtain maximum crystallinity and dense molar mass distributions in the PTFE. A preferred energy dose ranges from 50 kGy to 800 kGy. Gy is an SI unit and is equivalent to joule/kg.

Scrap of all known types of PTFE are suitable for radiation degradation. The starting material of scrap PTFE is preferably subjected to a cleaning procedure and pre-radiation to make the material brittle. The radiation degradation of the cleaned scrap PTFE then continues similar to the process used on pure PTFE-materials. The radiation results in the embrittlement of the PTFE-material, which facilitates the grinding of the material. Thus a very low particle size PTFE material is obtained. The molecular weight of the PTFE-material is considerably lowered and its crystallinity considerably increased.

The content of the non-expandable, radiation degraded component which is added to the high-molecular PTFE together with the lubricant is 1 to 50% by mass, relative to the total PTFE mass and is preferably 4 to 30% by mass. If the content of the degraded component is more than 50%, problems may be encountered during processing.

The particle size of the radiation-degraded material ranges from 0.1 to 100 micrometers, preferably 0.2 to 20 micrometers. Larger particles change the surface structure of the product and initiate defects in the node/fibril areas.

Suitable lubricants comprise a wide variety of liquids which are normally used for paste extrusion. Such lubricants include diesel oils, hydrocarbons, toluol, silicone oils, fluorocarbons, polymer solutions, mixtures thereof and water or aqueous surfactant solutions. For the tests described in the following examples, an i-paraffin oil with a boiling range of 181° C. to 212° C. was used. The lubricant content, relative to the PTFE-mixture, depends on the type and polymeric chain length of the added degraded component and the desired extrusion pressure. Usually the amount of lubricant added is 10 to 50% by mass, relative to the mixture and is preferably 20 to 40% by mass.

The mixing process of the high-molecular PTFE emulsion polymerisate with the radiation-degraded component and the lubricant is variable. For instance, the high-molecular PTFE may be pre-mixed in a dry mixer with the radiation-degraded component, after a certain time the lubricant is added and a mixing process ensues afterwards. The mixing time is variable and mainly depends on the type of the component which has been degraded by radiation. Preferably the mixing time is between 10 minutes and 180 minutes. Mixing is continued until a complete homogenization results.

Alternatively, the radiation degraded component may first be added to the lubricant and mixed to create a homogenous dispersion which is then added to the PTFE emulsion polymerisate. Another alternative includes producing a homogenous micro-powder dispersion of the radiation-degraded component which is then added to a PTFE-dispersion. Subsequently, the dispersion is precipitated, (e.g. with a polyelectrolyte) water is removed, the material is dried and a lubricant is then added to the mixture.

Subsequent steps including the production of the pressed billet, the paste extrusion with the subsequent calendering step and the removal of the lubricant, the stretching or expansion and the sintering process are described in detail in German Patent 2417901 and U.S. Pat. No. 3,962,153. These patents are hereby incorporated by reference. Uniaxial or biaxial expansion may be applied. Expansion rate is defined as the amount of expansion divided by the amount of time elapsed during expansion.

The radiation degraded perfluorinated polymerisate has a low molecular weight and a lower melting point than the expanded porous PTFE which forms the predominant structure of the resulting product. At higher temperatures, the lower chained molecules are more movable and tend to migrate to the surface of the nodes. The lower chained molecules are re-oriented in the highly crystalline range and are subject to an order influenced in the non-melted polymer part of the fibril structure. As a result, with the end groups of the added short-chained polymerisates grouped on the node surface, the DSC (differential scanning calorimetrics=differential thermo-analysis) shows a broader main melting point, and the melting heat/recrystallization heat of the compound materials is higher compared to materials made from pure high-molecular PTFE such as those described in U.S. Pat. No. 4,187,390. It appears that highly ordered micro-crystallite structures are created causing the resulting material to have greater strength.

The increased number of end groups in the expanded material and the addition of electron-irradiated PTFE additionally changes the surface properties of the expanded PTFE. Materials including membranes are produced with an improved affinity to adhesive agents and with ionic and polar bonds. This is highly desirable because it simplifies the admixability of fillers, the metallisation of such materials and the durability of coating systems, for example, with polymer coatings on expanded PTFE. The resulting product may be in any shaped article such as membrane fiber or rod.

The following examples more clearly illustrate the process of making the modified product and resulting properties. Chemical and physical test methods used in the examples include:

Molecular Weight

For low molecular weight PTFE that has been degraded, the molecular weight is determined by the formula:

$$Mn = \frac{200}{685}\left(\frac{1}{Tm} - \frac{1}{600}\right)$$

wherein Tm=melting temperature in °K. Higher molecular weights of PTFE may be determined from the formula (Doban & Sperati):

$$MW_n^* = 0.597 \log \frac{0.157^{-1}}{2.306 - SSG} \times 10^6$$

wherein SSG=the standard specific gravity of the PTFE. The standard specific gravity may be calculated in accordance with ASTM standards D1457-62T and D727-60T.

*"Formula from Molecular Weight of Polytetrafluoroethylene" by R. C. Doban, A. C. Knight, J. H. Peterson, C. A. Sperati, American Chemical Society Meeting in Atlantic City, N.J.—September, 1956

Particle Size

The data for the particle sizes of commercially available polymers were taken from data sheets of the manufacturer. Supplementary measurements were made with a particle measuring unit from the company Leeds & Northrup Microtrac, FRA Model 9250, Particle Size Analyzer. Approximately 0.5 g of pulverized PTFE was dispersed in 20 ml of octane. The mixture was homogenized in an ultrasonic bath, placed in a flow through cell of the particle size analyzer. The particle size was determined by laser bending.

Average Pore Diameter/Bubble Point

A sample membrane having a 25 mm diameter was obtained and wetted with perfluoroether. The wetted sample was placed in a Coulter Porometer wherein the average pore diameter of the final product was determined.

The bubble point was determined by measuring the pressure at which air bubbles permeate a sample that has been wetted with isopropanol. A sample membrane that had been wetted with isopropanol was placed on a porous carrier covered with a woven carrier and clamped into place. Air pressure was applied from below and the pressure increased at discrete increments. The pressure was recorded at the instance at which the first bubble was formed.

Gurley Number

A sample was placed on a porous carrier forming the base of a column. The top plate of the column was pressed down at a pressure of 1.2 kPa, and the time was determined at which 100 cm$^3$ passed through an area of 6.45 cm$^3$ to yield air permeability.

Differential Scanning Calorimetry (DSC)

A 10 mg sample was placed in an oven and heated at a rate of 10° K./min. to a temperature of 200°–400° C., until the sample began to melt. A Mettler DSC 20 was used and showed a peak at the point of fusion (melting).

Scanning Electron Microscope

A sample of membrane was sputtered with gold and measured in the Scanning Electron Microscope under vacuum. The Scanning Electron Microscope used was a Jeol, JSM4500 commercially available from Contron Elektronik, Germany.

Infrared Spectroscopy

The measurements were made with an infrared spectrometer IFS 66 of the Bruker company. A sample having a diameter of 13 mm was clamped into place in the IFS Spectrometer. Light absorption was measured at 64 scan and a resolution of 4 cm$^{-1}$.

Break Elongation/Tear Resistance (Machine Direction)

The measurements were made on INSTRON (Instron Corporation Series IX—automatic material testing system 1.09) according to DIN standard 53 888.

A sample membrane cut to the specifications of the DIN Standard was clamped into place over a 50 mm length and elongated at 100 mm/min. at 20° C. and 65% humidity. Elongation and resistance immediately before breakage were recorded by the machine.

Microporous Membrane from Electron-Irradiated PTFE

EXAMPLE 1

A PTFE emulsion polymerisate made in accordance with EP0170382 was electron irradiated at 500 Gy at room temperature to a melt flow index corresponding to that of PTFE micropowder TF9202 commercially available from Hoechst AG of Germany and then tempered for 30 minutes at 200° C. One thousand twenty (1020) g of this irradiated PTFE emulsion polymerisate was premixed for 10 minutes with 5784 g of the same PTFE emulsion polymerisate (made in accordance with EP0170382 and having a molecular weight greater than $5 \times 10^6$) that was not irradiated. A lubricant, parrafin oil having a boiling point in the range 181° C. to 212° C. (2.16 liters) was then added to the premixture and the components were further mixed for twenty minutes.

The mixture was then pressed into a billet at 36 bars. Subsequent extrusion and calendering produced a PTFE tape measuring 0.15 mm in thickness. This tape was guided through a heating zone at 230° C. to remove the lubricant, longitudinally expanded at a rate of approximately 500% per second at a ratio of 1:4 to form a membrane and sintered at 370° C.

The properties of the resulting article (membrane) are shown in Table 1.

EXAMPLE 2

An emulsion polymerisate similar to that described in Example 1 was electron irradiated under conditions identical to those described in Example 1. Four hundred eight (408) g of this irradiated emulsion polymerisate was premixed for 10 minutes with 6396 g of PTFE emulsion polymerisate, similar to that described in Example 1. A lubricant, paraffin oil having a boiling range of 181° C. to 212° C. (2.16 liters) was added to the premixture and the components were further mixed for twenty minutes. The mixture was pressed into a billet at 36 bars. Subsequent paste extrusion and calendering produced a tape measuring 0.155 mm in thickness. This tape was guided through a heating zone at 230° C. to remove the lubricant, expanded at 1:4 in the longitudinal direction at a rate of approximately 500% per second to form a membrane and sintered at 370° C.

The properties of this membrane are shown in Table 1.

EXAMPLE 3

An emulsion polymerisate, TF 2025, was obtained commercially from Hoechst AG of Germany. The emulsion polymerisate was electron irradiated (600 kGy) at room temperature and then tempered at 200° C. for 30 minutes.

A PTFE emulsion polymerisate(molecular weight$>5\times10^6$) made in accordance to EP0170382 (6396 g) was premixed with 408 g of the electron-irradiated emulsion polymerisate (TF 2025) for 10 minutes. Paraffin oil having a boiling point in the range of 181° to 212° C. (2.22 liters) was added to the components and mixed for 30 minutes. The mixture was pressed into a billet at 36 bars. Subsequent paste extrusion and calendering produced a PTFE tape measuring 0.152 mm in thickness. This tape was guided through a heating zone at 230° C. to remove the lubricant, expanded 1:4 in the longitudinal direction at a rate of approximately 500% per second to form a membrane and sintered at 370° C.

The properties of this membrane are shown in Table 1.

EXAMPLE 4

Expanded PTFE made in accordance with U.S. Pat. No. 3,953,566 (GORE-TEX ® film) was obtained and electron irradiated at room temperature at 300 kGy. The GORE-TEX film did not contain any additives and was not precleaned before irradiating. The electron irradiated PTFE was tempered at 200° C. for 30 minutes.

A PTFE emulsion polymerisate (molecular weight$>5\times10^6$) made in accordance with EP0170382 (6396 g) was premixed with 408 g of the electron-irradiated expanded PTFE (GORE-TEX ® film) for 10 minutes. Paraffin oil having a boiling point in the range of 181° C. to 212° C. (2.22 liters) was added and the components were further mixed for 20 minutes. The mixture was then pressed into a billet at 36 bars. Subsequent paste extrusion and calendering produced a PTFE-tape measuring 0.16 mm in thickness. This tape was guided through a heating zone at 230° C. to remove the lubricant, expanded 1:4 in the longitudinal direction at a rate of approximately 500% per second to form a membrane and sintered at 370° C.

The properties of this membrane are shown in Table 1.

FIG. 1 shows a photomicrograph taken at 2000× magnification of the sample membrane product.

Figure 2:
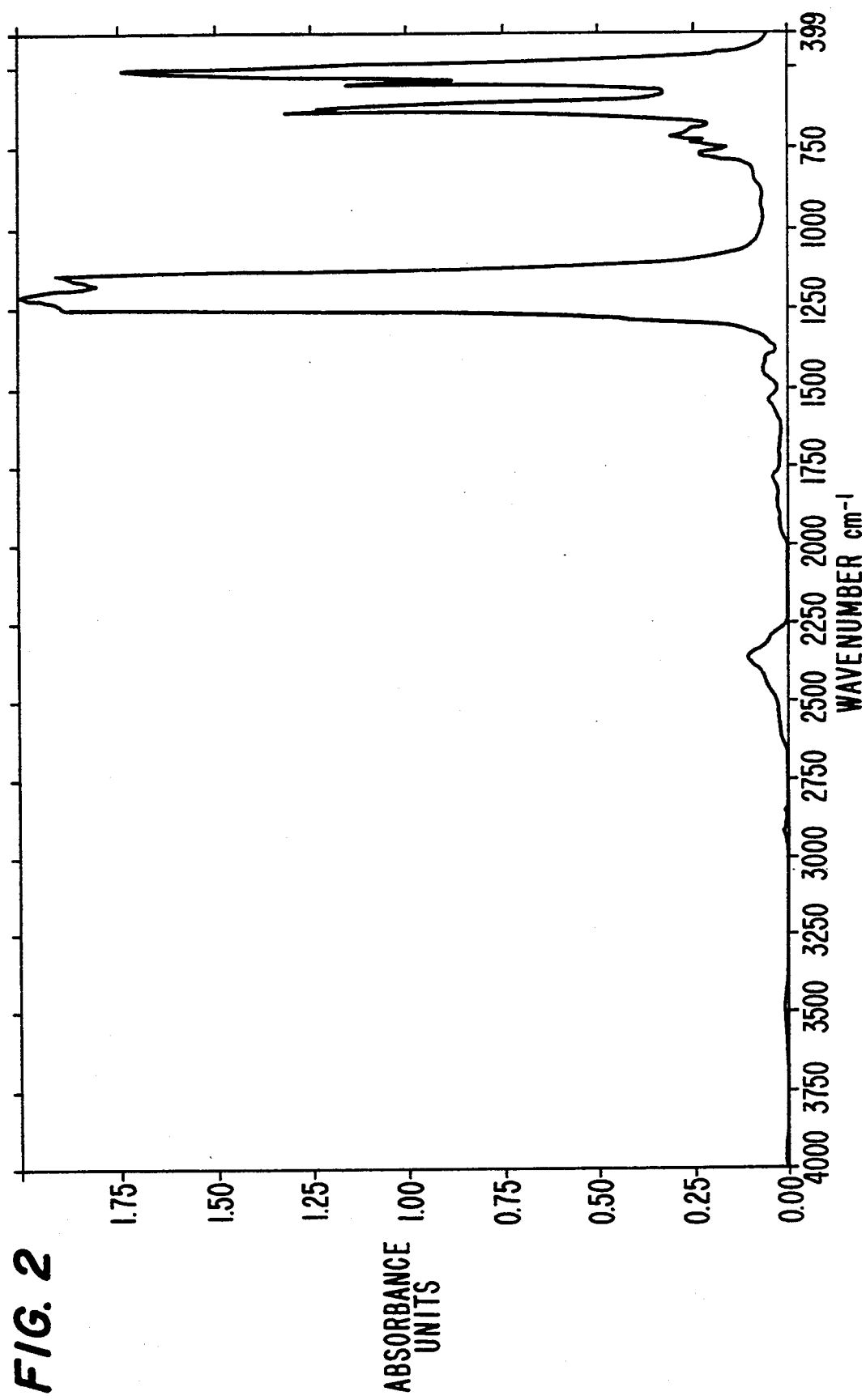
FIG. 2 is a graphical printout of the Fourier Transformation infrared spectrophotometer adsorption scan of the microporous PTFE structure made in accordance with Example 4.

FIG. 2 is an absorption scan of the Fourier transformation IR spectroscopy of the sample microporous PTFE structure.

Microporous Membrane With Radiation Degraded commercially available PTFE

EXAMPLE 5

A PTFE emulsion polymerisate (molecular weight$>5\times10^6$) made in accordance with EP0170382 (5784 g) was premixed with 1020 g of PTFE micropowder MP 1200 commercially available from E. I. duPont de Nemours, Inc. of Wilmington, Del. for 10 minutes. Paraffin oil having a boiling point in the range of 181° C. to 212° C. (2.07 liters) was added to the components and further mixed for 20 minutes. The mixture was then pressed into a billet at 36 bars. Subsequent paste extrusion and calendering produced a PTFE-tape measuring 0.147 mm in thickness. This tape was guided through a heating zone at 230° C. to remove the lubricant, expanded 1:4 in the longitudinal direction at a rate of approximately 500% per second to form a film and sintered at 370° C.

The properties of this membrane are shown in Table 1.

EXAMPLE 6

A PTFE emulsion polymerisate (molecular weight$>5\times10^6$) made in accordance with EP0170382 (6396 g) was premixed with 408 g PTFE micropowder MP 1200 commercially available from E. I. DuPont de Nemours, Inc. of Wilmington, Del. for 20 minutes. Paraffin oil having a boiling point in the range of 181° C. to 212° C. (2.19 liters) was added to the components and further mixed for 10 minutes. The mixture was pressed into a billet at 14 bars. Subsequent paste extrusion and calendering produced a tape measuring 0.15 mm in thickness. This tape was guided through a heating zone at 230° C. to remove the lubricant, expanded 1:4 in the longitudinal direction at a rate of approximately 500% per second to form a membrane and sintered at 370° C.

The properties of this membrane are shown in Table 1.

EXAMPLE 7

A PTFE emulsion polymerisate (molecular weight$>5\times10^6$) made in accordance with EP0170382 (6396 g) was premixed with 408 g PTFE micropowder MP 1300 commercially available from E. I. DuPont de Nemours, Inc. of Wilmington, Del. for 10 minutes. Paraffin oil having a boiling point in the range of 181° C. to 212° C. (2.19 liters) was added to the components and further mixed for 20 minutes. The mixture was then pressed into a billet at 36 bars. Subsequent paste extrusion and calendering produced a tape measuring 0.16 mm in thickness. This tape was guided through a heating zone at 230° C. to remove the lubricant, expanded 1:4 in the longitudinal direction at a rate of approximately 500% per second to form a membrane and sintered at 370° C.

The properties of this membrane are shown in Table 1.

Comparative Example A

A PTFE emulsion polymerisate (molecular weight$>5\times10^6$) made in accordance with EP0170382 (27220 g) was mixed with 5.95 kg of paraffin oil having a boiling point in the range of 181° C. to 212° C. for 20 minutes and pressed into a pellet at 36 bars. Subsequent paste extrusion and calendering produced a PTFE-tape measuring 0.19 mm in thickness. This tape was guided through a heating zone at 230° C. to remove the lubricant, expanded 1:4 in the longitudinal direction at a rate of approximately 500% per second to form a membrane and sintered at 370° C.

The properties of this membrane are shown in Table 1.

TABLE 1

| | PROPERTIES OF COMPOUND MEMBRANES | | | | | | |
|---|---|---|---|---|---|---|---|
| Example | Particle size of Additives in micrometer | Pore Diameter in micrometer | Bubble Point i-propanol in bar | Gurley in sec | Melting Heat in J/g | Break Elongation in % | Tear Strength in N/mm² |
| 1 | Agglomerate | 0.8 | 0.5 | 6.5 | 36.7 | 94 | 38 |
| 2 | Agglomerate | 0.8 | 0.5 | 7 | 32.8 | 90 | 39 |

TABLE 1-continued

PROPERTIES OF COMPOUND MEMBRANES

| Example | Particle size of Additives in micrometer | Pore Diameter in micrometer | Bubble Point i-propanol in bar | Gurley in sec | Melting Heat in J/g | Break Elongation in % | Tear Strength in N/mm² |
|---|---|---|---|---|---|---|---|
| 3 | 4 | 0.8 | 0.5 | 5.5 | 34.5 | 72 | 33 |
| 4 | <10 | 1 | 0.6 | 9 | 33.0 | 77 | 30 |
| 5 | 3 | 0.8 | 0.5 | 5 | 36.9 | 122 | 38 |
| 6 | 3 | 0.7 | 0.6 | 7.5 | 33.5 | 149 | 61 |
| 7 | 15 | 0.8 | 0.5 | 11 | 41.3 | 80 | 36 |
| A | | 2.0 | 0.2 | 3 | 31.5 | 61 | 21 |

Microporous Unsintered membrane With Electron-Irradiated PTFE

EXAMPLE 8

An emulsion polymerisate TF2025 commercially available from Hoechst AG of Germany (106.6 g) was premixed for 10 minutes with 6.8 g of electron-irradiated (400 kGy) expanded PTFE made in accordance with U.S. Pat. No. 3,953,566 that was not sintered. Paraffin oil having a boiling point in the range of 181° C. to 212° C. (34 mililiters) was added to the components and further mixed for 20 minutes. The mixture was then pressed into a billet in 15 sec. at 3.5 bars. The irradiation steps were the same as those described in Example 1 except for the electron irradiation exposure which was 400 kGy for this example. Subsequent paste extrusion at 176 bars and expansion (25:1) at a rate of approximately 1000% per second at 300° C. produced a film measuring 0.18 mm in thickness and 13 mm in width. The results are summarized in Table 2.

Comparative Example B

An emulsion polymerisate TF2025 commercially available from Hoechst AG of Germany (113.4 g) was premixed with 32.5 ml paraffin oil having a boiling range 181° C. to 212° C. for 20 minutes and pressed into a billet in 15 sec. at 3.5 bars. Subsequent paste extrusion at 181 bars and expansion (25:1) at a rate of approximately 1000% per second at 300° C. produced a film measuring 0.15 mm in thickness and 15 mm in width. The results are summarized in Table 2 and can be compared to the results of Example 8.

TABLE 2

Properties of Unsintered Compound Membranes

| Example | Particle Size of Additives in micrometers | Melting Heat J/g | Break Elongation % | Tear Strength N/mm² |
|---|---|---|---|---|
| 8 | <10 | 29.6 | 25 | 12.3 |
| B | | 27.0 | 18 | 10.8 |

Microporous Biaxially Expanded Membrane With Electron-irradiated PTFE

EXAMPLE 9

Expanded PTFE (GORE-TEX ® membrane) (544 g) made in accordance to U.S. Pat. No. 3,953,566 was electron irradiated at 400 kGy (particle size less than 10 micrometers) and dispersed in 2.22 liters of paraffin oil having boiling range from 181° C. to 212° C. for 10 minutes. A PTFE emulsion polymerisate (molecular weight greater than $5 \times 10^6$) made in accordance with EP0170382 (6260 g) was added. All components were mixed for 20 minutes and pressed into a billet at 36 bars. Subsequent paste extrusion and calendering produced a PTFE-tape measuring 0.2 mm in thickness. This tape was guided through a heating zone at 230° C. to remove the lubricant, expanded at 1:6 at a rate of approximately 200% per second in the cross direction and simultaneously expanded at 1:4 in the longitudinal direction at approximately the same rate and sintered at 370° C.

Comparative Example C

A PTFE emulsion polymerisate (molecular weight $> 5 \times 10^6$) made in accordance with EP0170382 was mixed with 5.90 kg of paraffin oil (boiling range 181° C. to 212° C.) for 20 minutes and pressed into a pellet at 36 bars. Subsequent paste extrusion and calendering produced a PTFE-tape measuring 0.19 mm in thickness. This tape was guided through a heating zone at 230° C. to remove the lubricant, expanded at 1:6 at a rate of approximately 200% per second in the cross direction and simultaneously expanded at 1:4 in the longitudinal direction at approximately the same rate and sintered at 370° C.

EXAMPLE 10

Samples made in accordance with Examples 1-9 and comparative Examples A and C were subjected to impregnation and coating with additives including polycations and silane coatings. Various tests were carried out. The experiments confirmed that expanded compounds with irradiated PTFE have an increased affinity to other polymers, coating systems and adhesive agents and have a reduced oleophobicity and hydrophilicity. Tables 3-6 summarize the additives used, amounts of additives and the results.

TABLE 3

Loadability/Charge Reversal of membranes With Polyelectrolytes

| Example Membrane | Flow Potential in mV | Polycation Load* in % | Flow Potential [Zeta-potential] After Loading in mV |
|---|---|---|---|
| A | −17.0 | 0.7 | +20.0 |
| 4 | −19.9 | 0.9 | +17.2 |
| 5 | −26.8 | 2.1 | +17.9 |

*A prewetted membrane was put in an aqueous 0.1 n polyallylamine solution at 60° C. for 10 minutes and dried at 130° C.

TABLE 4

Loadability/Reaction of the Membrane With Adhesive Agents

| Membrane | Silane*** | Mass Increase in % |
|---|---|---|
| A | A* 1100 (0.1 n) | 0 |
| 4 | A* 1100 (0.1 n) | 1.0 |
| 5 | A* 1100 (0.1 n) | 1.3 |
| A | GF91** (0.1 n) | 0 |
| 4 | GF91** (0.1 n) | 1.3 |

TABLE 4-continued

Loadability/Reaction of the Membrane With Adhesive Agents

| Membrane | Silane*** | Mass Increase in % |
|---|---|---|
| 5 | GF91** (0.1 n) | 1.6 |

*A1100: $H_2NCH_2CH_2NH(CH_2)Si(OCH_3)_3$
**GF91: $H_2N(CH_2)_3Si(OC_2H_5)_3$
***A membrane was wetted with i-propanol and then put into a 0.1 n Shellsol solution (boiling point 60–95° C.) of the silane for 30 minutes. The membrane was squeezed off, rinsed with water and dried at 130° C.

TABLE 5

Affinity/Adhesion of the Membranes in coating Systems

| Example Membrane | Coating | Coating Thickness Micrometers | Peel Test |
|---|---|---|---|
| C | Polyetherurethane | 10 | Coating can be torn off |
| 9 | Polyetherurethane | 10 | Membrane is destroyed |

TABLE 6

Surface Characteristics of Membrane

| Example Membrane | Flow Potential of Membrane in mV | Contact Angle Against Water | Contact Angle Against $CH_2I_2$ |
|---|---|---|---|
| A (uniaxial) | −17 | 128 | 116 |
| C (biaxial) | −21.8 | 138 | 117 |
| 1 (uniaxial) | −18.2 | 126 | 111 |
| 4 (uniaxial) | −19.9 | 121 | 111 |
| 9 | −21.1 | 130 | 116 |

TABLE 6-continued

Surface Characteristics of Membrane

| Example Membrane | Flow Potential of Membrane in mV | Contact Angle Against Water | Contact Angle Against $CH_2I_2$ |
|---|---|---|---|
| (biaxial) 5 (uniaxial) | −26.8 | 122 | 106 |

We claim:

1. A process for the production of porous polytetrafluoroethylene material comprising the following steps:
   (a) degrading polytetrafluoroethylene by radiation wherein the degradation step causes the polytetrafluoroethylene to have an average numerical molecular weight of at most below $10^6$;
   (b) mixing the degraded polytetrafluoroethylene having an average numerical molecular weight between $2\times10^6$ and $50\times10^6$ with a high-molecular emulsion polymerisate of polytetrafluoroethylene to form a mixture;
   (c) extruding said mixture to form an extrudate; and
   (d) expanding said extrudate to form a porous material.

2. A process for the production of porous polytetrafluoroethylene material as described in claim 1 further comprising the step of sintering the material.

3. A process as described in claim 1 wherein the degradation step is accomplished by means of electron rays.

4. A process as described in claim 1 wherein the degradation step utilizes an energy dose of 10 to 3000 kGy.

5. A process as described in claim 1 wherein degraded polytetrafluoroethylene is added in a quantity of 1 to 50% relative to the total mass.

6. A process as described in claim 1 wherein the degraded polytetrafluoroethylene has a particle size of 0.1 to 100 micrometers.

* * * * *